US010750131B1

United States Patent
Child et al.

(10) Patent No.: US 10,750,131 B1
(45) Date of Patent: *Aug. 18, 2020

(54) ADJUSTABLE MOVEMENT DETECTION DOORBELL

(71) Applicant: Vivint, Inc., Provo, UT (US)

(72) Inventors: Michael D. Child, Lehi, UT (US); Jowen Lin, Zhubei (TW)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,773

(22) Filed: May 28, 2019

Related U.S. Application Data

(63) Continuation of application No. 14/885,030, filed on Oct. 16, 2015, now Pat. No. 10,306,187.

(51) Int. Cl.
| | |
|---|---|
| H04N 7/18 | (2006.01) |
| H04N 5/235 | (2006.01) |
| H04M 11/02 | (2006.01) |
| H04N 5/14 | (2006.01) |
| H04N 5/225 | (2006.01) |
| H04M 1/02 | (2006.01) |
| H05B 47/105 | (2020.01) |
| G08B 15/00 | (2006.01) |

(52) U.S. Cl.
CPC .......... *H04N 7/183* (2013.01); *H04M 1/0291* (2013.01); *H04M 11/025* (2013.01); *H04N 5/144* (2013.01); *H04N 5/2256* (2013.01); *H04N 5/2354* (2013.01); *H04N 7/186* (2013.01); *H05B 47/105* (2020.01); *G08B 15/00* (2013.01); *Y02B 20/44* (2013.01)

(58) Field of Classification Search
CPC .. G08B 13/1961; G08B 13/22; G08B 29/185; G08B 15/00; G05B 5/36; H04B 5/144; H04N 7/183; H04N 5/2354; H04N 5/2256; H05B 33/0854; H05B 47/105; H04M 11/025; H04M 11/0291; Y02B 20/44
See application file for complete search history.

(56) References Cited

U.S. PATENT DOCUMENTS

| | | | |
|---|---|---|---|
| 8,253,849 B2 | 8/2012 | Chuang et al. | |
| 2012/0112667 A1 * | 5/2012 | Mohan ................... | H05B 47/16 315/307 |

(Continued)

FOREIGN PATENT DOCUMENTS

| | | |
|---|---|---|
| CN | 203340213 U | 12/2013 |
| CN | 203416335 U | 1/2014 |

(Continued)

OTHER PUBLICATIONS

English Machine Translation of CN203340213, Dec. 11, 2013.
(Continued)

*Primary Examiner* — Raymond R Chai
(74) *Attorney, Agent, or Firm* — Holland & Hart, LLP

(57) ABSTRACT

Systems, apparatuses, and methods relating to security system and automation monitoring are described. In one embodiment a method may include receiving motion detection data via an electrical signal, analyzing the motion detection data based at least in part on a first parameter, identifying a movement of an object based at least in part on the analyzing, and adjusting one or more light emitting diodes based at least in part on the identifying.

20 Claims, 9 Drawing Sheets

(56) References Cited

U.S. PATENT DOCUMENTS

| | | | | |
|---|---|---|---|---|
| 2012/0286673 A1* | 11/2012 | Holland | ............... | H05B 47/175 |
| | | | | 315/155 |
| 2013/0147974 A1* | 6/2013 | Ju | ...................... | H04N 5/23248 |
| | | | | 348/208.1 |
| 2014/0192206 A1* | 7/2014 | Holz | .................. | H04N 5/23241 |
| | | | | 348/169 |
| 2014/0267716 A1* | 9/2014 | Child | ..................... | H04N 7/186 |
| | | | | 348/143 |
| 2016/0027262 A1* | 1/2016 | Skotty | .............. | G08B 13/19632 |
| | | | | 340/541 |

FOREIGN PATENT DOCUMENTS

| | | |
|---|---|---|
| JP | 2013109440 A | 6/2013 |
| WO | 2013073783 A1 | 5/2013 |

OTHER PUBLICATIONS

English Machine Translation of CN203416335, Jan. 29, 2014.
English Machine Translation of JP2013109440A, Jun. 6, 2013.
English Machine Translation of WO2013/073783, May 23, 2013.
Haldas, Mike, What is smart IR for Security Cameras?, obtained from http://videos.cctvcamerapros.com/uncategorized/what-is-smart-ir.html, on Jul. 16, 2014.
Mesfin Getaneh, EIC 2800 Search Report, Dec. 15, 2017, Scientific and Technical Information Center.

\* cited by examiner

ADJUSTABLE MOVEMENT DETECTION DOORBELL

CROSS REFERENCE

The present application us a continuation of U.S. patent application Ser. No. 14/885,030, filed Oct. 16, 2015, titled "ADJUSTABLE MOVEMENT DETECTION DOORBELL", and assigned to the assignee hereof, the disclosure of this reference is incorporated herein in their entirety by this reference.

BACKGROUND

The following relates to improved monitoring and recording systems, which may particularly apply to security and home automation systems and related applications. Current monitoring systems—including exterior flood lights—have certain shortcomings preventing them from use in at-the-door monitoring. There are a number of challenges facing companies attempting to use movement monitoring services at an entry point—particularly with monitoring through inconspicuous means, such as a doorbell or other commonly used device. For example, these systems may require high energy output, produce false results that inappropriately alarm or trigger customers, decrease productivity and product life, improperly alert potential intruders, and other problems.

SUMMARY

According to at least one embodiment, a computer-implemented method for security system monitoring is described. In some embodiments, the method may include receiving motion detection data via an electrical signal, analyzing the motion detection data based at least in part on a first parameter, identifying a movement of an object based at least in part on the analyzing, and/or adjusting one or more light emitting diodes based at least in part on the identifying.

In some embodiments the first parameter may include a first sensitivity level. In some embodiments analyzing the motion detection data may include analyzing the motion detection data based on a second sensitivity level, the second sensitivity level being greater than the first sensitivity level. In some embodiments adjusting the one or more light emitting diodes may include activating the one or more light emitting diodes.

In some embodiments adjusting the one or more light emitting diodes may include changing an intensity level of the one or more light emitting diodes from a first intensity level to a second intensity level. In some embodiments adjusting the one or more light emitting diodes may include changing the intensity level of the one or more light emitting diodes from the second intensity level to a third intensity level. In some embodiments the second intensity level may be different than or greater than the first intensity level. In some embodiments the second intensity level may be at least double the first intensity level.

In some embodiments the first intensity level may be approximately between 20% and 40% of full intensity for the one or more light emitting diodes. In some embodiments the second intensity level may be more than 50% of full intensity for the one or more light emitting diodes. In some embodiments adjusting the one or more light emitting diodes may include changing the intensity level of the one or more light emitting diodes from the second intensity level to the first intensity level based at least in part on the motion detection data.

In some embodiments the one or more light emitting diodes may include infrared light emitting diodes. In some embodiments receiving the motion detection data may be based at least in part on the one or more light emitting diodes operating at a first intensity level.

In some embodiments receiving the motion detection data may be based at least in part on an input indicating a user proximity. In some embodiments the input may include user input. In some embodiments at least one of analyzing the motion detection data and identifying the movement of the object may be performed via a linked server, a local security panel, and/or a housing where the motion detection data is obtained. In some embodiments the motion detection data may include video motion detection data.

According to at least one embodiment an apparatus for security system monitoring is disclosed. In some embodiments the apparatus may include a camera to capture motion detection data, an actuator, an adjustable light source, at least one processor, memory in electronic communication with the at least one processor, and/or instructions stored in the memory, the instructions being executable by the at least one processor. In some embodiments the instructions may be executable by the at least one processor to receive motion detection data via an electrical signal, analyze the motion detection data based on at least a first parameter, identify a movement of an object based at least in part on the analyzing, and/or adjust the adjustable light source based at least in part on the identifying.

According to at least one embodiment a non-transitory computer-readable storage medium storing computer executable instructions is disclosed. In some embodiments the computer executable instructions may be executed by a processor and cause the processor to receive motion detection data via an electrical signal, analyze the motion detection data based on at least a first parameter, identify a movement of an object based at least in part on the analyzing, and/or adjust a light source based at least in part on the identifying. In some embodiments adjusting the light source may include changing an intensity level of the light source from a first intensity level to a second intensity level greater than the first intensity level.

BRIEF DESCRIPTION OF THE DRAWINGS

The accompanying drawings illustrate a number of exemplary embodiments. These drawings are incorporated as part of this disclosure. Together with the following description, these drawings demonstrate and explain various principles of the disclosure. These drawings do not limit the disclosure in any way and should not be construed as such—only serving as exemplary depictions.

Figure 1:
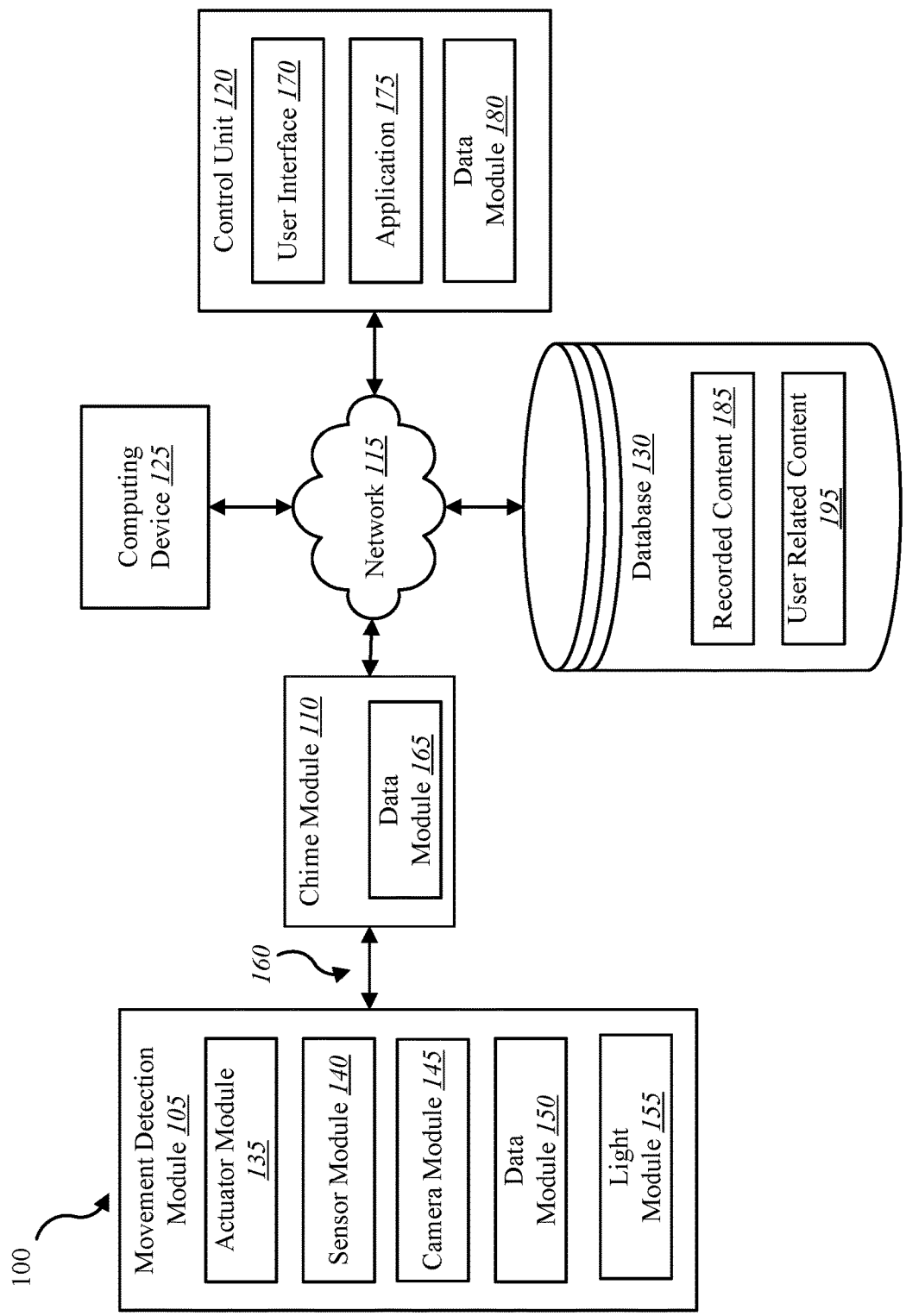
FIG. 1 depicts a block diagram of exemplary systems and methods suitable for implementing the present systems and methods.

While the embodiments described here are susceptible to various modifications and alternative forms, specific embodiments have been shown merely by example in the drawings and are described in detail. The exemplary embodiments described, however, are not limited to the particular forms, details, structures, or other characteristics disclosed. Rather, this disclosure covers all modifications, equivalents, and alternatives falling within the scope of the appended claims.

DETAILED DESCRIPTION

Some embodiments relate to systems, methods, and devices for enhancing monitoring services, particularly for security systems. Some video monitoring services and devices may use some form of detection or monitoring. The present systems and methods, however, may use active data monitoring to determine certain characteristics—like movement—based on movement detection data.

In some embodiments this may include monitoring using infrared light emitting diodes (LEDs) in conjunction with video and/or image motion monitoring software or systems. In other embodiments this may include using non-infrared white lights. In some embodiments this may include using pre-existing lighting—like already-installed porch lights in the home security application—to light an entry point such as a door and/or a window based on one or more inputs.

This technology leverages newly developed monitoring systems, including those used at structure entry points, and provides advanced and more accurate motion detection monitoring through analyzing movement detection data.

In some embodiments the motion monitoring data may be one or more captured still images. In some embodiments the motion monitoring data may be video motion monitoring data. This video motion monitoring data may include one or more frames of captured video data. This video motion monitoring data may include one or more videos of captured video data. In some embodiments this captured data may include data that is saved and/or recorded by some device of the system or connected to the system, such as a camera. This recording or saving may be permanent or may be done for a specified interval (e.g., a month, a week, a day, an hour, a minute, etc.). In other embodiments the data may not be saved and/or recorded, but may be analyzed in real-time or pseudo real-time by the system.

In some embodiments the present system and methods may be used at one or more structure entry points—such as a doorway, a window, or a stairwell, among others. In some embodiments the motion detection data may include one-way or two-way video feed data. In some embodiments the motion detection data may include one-way or two-way audio feed data. In some embodiments the motion detection data may include one-way or two-way image feed data. In some embodiments the motion detection data may include one or more images.

In some embodiments the present systems and methods may operate at a low intensity or power mode and then change to a high intensity or power mode based on one or more inputs. For example, the video monitoring system may incorporate infrared monitoring using LEDs. In an initial state, these LEDs may operate in a lower output mode. In some embodiments this lower output mode may be approximately between 10%-50% of full intensity. In some embodiments this lower power mode may be approximately between 20%-40% of full intensity. Operating in these lower intensity ranges provides distinct advantages including, but not limited to, increasing component life, decreasing power consumption, increasing safety, increasing effective monitoring, decreasing visibility of such monitoring systems to potential would-be intruders (assuming use of visible light), and others.

In some embodiments the present systems and methods include using motion detectors to obtain motion detection data, such as video motion detection data, and then changing the intensity of one or more associated LEDs based at least in part on the motion detection data. As discussed below, certain characteristics of the motion detection data may influence or dictate whether a light source intensity may be changed.

Based on one or more events, the monitoring system may increase to a higher output mode—that may include operating at a higher intensity than that of the lower output mode. In some embodiments this higher output mode may include operating between 50%-100% intensity. Advantages of this lower-to-higher adjustment include at least: reducing energy consumption, reducing LED operating temperature, reducing wear-and-tear on components of the video monitoring system and extending operating life, and decreasing the visibility of the video monitoring system to a person near the entry point—all while also maintaining sufficient visibility in the area near the entry point (within a few meters or feet) or other monitored area.

The one or more inputs that may trigger switching from low intensity mode to high intensity mode may include an event detected based on movement detection data. The one or more inputs that may trigger switching from low intensity mode to high intensity mode may include an input based on motion detection including, but not limited to, video motion detection. The video monitoring and recording system may monitor and/or record video based on an input from a video motion detection device using an associated algorithm. This associated algorithm may reduce false positive or false negative video motion detection results.

In some embodiments the motion detection may be performed based on one or more sensitivity settings. These settings may include changing the motion detection sensitivity from a first sensitivity setting to a second sensitivity setting to increase the detection of motion. These settings may also include changing the motion detection sensitivity from a first sensitivity setting to a second sensitivity setting to decrease the detection of motion. In some embodiments the video motion detection sensitivity may be adjusted in a complementary manner to the power output mode of the LEDs. In some embodiments the video motion detection sensitivity may be adjusted inversely to the output mode of the LEDs.

In some embodiments the video motion detection data may be received and analyzed at the camera (or other device) capturing the video motion detection data itself. In other embodiments the data and associated analysis may be performed at a home security system panel, which in some embodiments may be located at the same location as the movement detection monitoring system (e.g., a doorbell incorporating video) and may receive the associated data by a wireless or a wired transmission. In other embodiments the data and associated analysis may be performed at or via a remote server or alternative location based on a wireless or a wired transmission potentially through a network.

Any discussion of any apparatus, system, method, and/or any other characteristic discussed with respect to one element (e.g., system 100) is not limiting and applies to every other discussion of that same element (e.g., system 100), same element type (e.g., another system), or any other element type (e.g., another device and/or method).

FIG. 1 is a block diagram illustrating one embodiment of a system 100 in which the present systems and methods may be implemented. In some embodiments the systems and methods described here may be performed in relation to on one or more devices illustrated in system 100. The system 100 may include movement detection module 105, chime module 110, control unit 120, computing device 125, database 130, and/or a network 115 that allows movement detection module 105, chime module 110, control unit 120, computing device 125, and/or database 130 to communicate with one another.

Movement detection module 105 may include an actuator module 135, a sensor module 140, a camera module 145, a data module 150, and/or a light module 155. Movement detection module 105 may connect to chime module 110 using a connection 160. Connection 160 may include a wired connection, a wireless connection, and/or both. Connection 160 may be used as described. In some embodiments connection 160 may facilitate illuminating an actuator and/or causing sound from a typical chime unit, among other things.

In some embodiments movement detection module 105 may include an actuator module 135. This actuator module 135 may include any button, switch, knob, toggle, lever, regulator, and/or other device. In some embodiments this actuator module 135 may be actuated by a user electronically, manually, and/or physically, including being actuated by the user's hand. In some embodiments this actuator module 135 may be actuated based on another input, such as a system 100 input, that may send a signal from the actuator module 135 to another module of movement detection module 105.

In some embodiments camera module 145 may capture one or more images using a camera in a housing, such as movement detection module 105. In some embodiments camera module 145 may capture one or more images and/or videos having of a certain length using a camera in a housing, such as a doorbell unit (e.g., movement detection module 105). The video or videos may be captured by camera module 145 and then saved, recorded, and/or stored by one or more elements of system 100, including but not limited to movement detection module 105, chime module 110, computing device 125, control unit 120, and/or database 130, among others. In some embodiments communication module 215 (shown in FIG. 2) may send—through a connection such as connection 160—data associated with the capturing of and/or the actual motion detection data by the camera module 145 of the movement detection module 105. For example, communication module 215 may relay a captured image over a wired connection.

In some cases camera module 145 may continuously capture, at a predetermined frame rate, images via a camera. The predetermined frame rate may be determined according to a setting of a camera, a user policy, manually set user preferences (e.g., user related content 195), past-used frame rates, system programming, system limitations, and/or system-based preferences. In one embodiment, sensor module 140 may detect motion via a sensor in the doorbell unit. Upon detecting the motion via the sensor, camera module 145 may capture one or more images via the doorbell camera. After determining that the doorbell camera is set to record continuously, camera module 145 may adjust a frame rate of the camera from a first frame rate to a second frame rate upon detecting the motion.

In other embodiments after determining that the camera is set to record at a certain rate and/or based on one or more characteristics, camera module 145 may adjust one or more characteristics (such as frame rate) of the camera based on movement detection data, analysis based at least in part on movement detection data, and/or identifications based at least in part on movement detection data. In some embodiments adjusting one or more characteristics based on movement detection data may include adjusting from a first frame rate to a second frame rate and/or to a third frame rate, where each of these frame rates may be higher, lower, different, similar, and/or related.

In some embodiments connection 160 may include one or more wires. In some embodiments a first wire runs from the movement detection module 105 to one end of a wire coil in the chime module 110. In some embodiments a second wire may run from the chime module 110 to one end of a transformer. The transformer may transform a typical household 120-volt current and step the voltage down to a voltage typically within the range of 5 to 24 volts. The second wire may exit the transformer and connect to the other end of the wire coil in the chime module 110. Connection 160 may include first and second wires similar to those described above. In some embodiments at least one wire from connection 160 may bypass a transformer—resulting in two wires running directly from movement detection module 105 to chime module 110 and/or from movement detection module 105 to other components of system 100 or other systems. In some embodiments movement detection module 105 may comprise a doorbell unit.

As described above, movement detection module 105 may include sensor module 140. In some embodiments sensor module 140 may include a camera sensor, an audio sensor, a proximity sensor, a motion sensor, an accelerometer, a capacitance sensor, a radio frequency sensor, a near-field sensor, a voice sensor, and/or an additional sensor. Sensor module 140 may represent one or more separate sensors or a combination of two or more sensors in a single housing or device. For example, sensor module 140 may represent one or more camera sensors and/or one or more motion sensors. In some embodiments sensor module 140 may be integrated with a facial recognition system, including incorporating sufficient programming and other characteristics to allow one or more system 100 elements (e.g., camera module 145) to identify if a face is present in the movement detection data.

In some embodiments the computing device 125 may include, but is not limited to, a media content set top box, satellite set top box, cable set top box, DVR, personal video recorders (PVRs), mobile devices, smart phones, personal computing devices, computers, servers, etc. In some embodiments the control unit 120 may include, but is not limited to, a dedicated home automation computing device (e.g., wall-mounted controller), a personal computing device (e.g., laptop, desktop, etc.), a mobile computing device (e.g., tablet computing device, smartphone, etc.), and/or other similar devices.

In some embodiments the system 100 may include a control unit 120 that may include a user interface 170, an application 175, and/or a data module 180. Although components of the movement detection module 105, chime module 110, control unit 120, and/or database 130 may be depicted as being internal to the respective elements, it is understood that one or more of the components may be external to each element and may be connected to one or more respective elements (e.g., 105, 110, 120, and/or 130) through one or more wired and/or wireless connections. In some embodiments application 175 may be installed on computing device 125 in order to allow a user to interface with a function of movement detection module 105, camera module 145, data module 165, control unit 120, and/or other devices of system 100.

In some embodiments movement detection module 105 may communicate with control unit 120, computing device 125, database 130, and/or other components via a communication path that includes a combination of connection 160, chime module 110, and/or network 115. In some embodiments network 115 may include cloud networks, local area networks (LAN), wide area networks (WAN), virtual private networks (VPN), wireless networks (using 802.11, for example), cellular networks (using 3G and/or LTE, for example), and/or other networks. In some embodiments the network 115 may include the internet.

In some embodiments movement detection module 105 may or may not include a data module 150 and/or another module. In some embodiments movement detection module 105, control unit 120, and/or chime module 110 may include a data module and/or another module, where at least a portion of the functions of data module 150 are performed separately and/or concurrently by movement detection module 105, control unit 120, computing device 125, and/or chime module 110. Likewise, in some embodiments a user may access one or more functions of movement detection module 105, chime module 110, database 130, and/or control unit 120 from computing device 125. For example, in some embodiments computing device 125 may include a mobile application that interfaces with one or more functions of movement detection module 105, control unit 120, chime module 110, and/or database 130.

In some embodiments one or more devices illustrated in system 100 may be coupled to database 130. Database 130 may include recorded content 185 and/or user related content 195. In some embodiments recorded content 185 may include movement data (e.g., one or more images videos, etc.) captured using camera module 145. For example, in some embodiments computing device 125 may access recorded content 185 in database 130 over network 115. In some embodiments database 130 may be internal or external to one or more devices of system 100 (i.e., connected to a device through network 115 and/or connected directly to one or more devices of system 100). For example, at least a portion of database 130 may be internal and/or external to movement detection module 105, chime module 110, control unit 120, and/or computing device 125. In some embodiments user related content 195 may include, but is not limited to, user preferences, passwords, personal information, system information (e.g., model numbers, installation dates, etc.), content specification other components of system 100 including movement detection module 105, chime module 110, network 115, control unit 120, computing device 125, and/or database 130, and/or information designated by the user as related to the system.

In some embodiments system 100 may include light module 155. Light module 155 may include one or more light sources, such as one or more LEDs. In some embodiments light module 155 may include one or more LEDs, which may be active, passive, infrared, non-infrared, arranged in a distinct pattern, random, pseudo-random, visible, non-visible, single colored, and/or multi-colored, etc.

In some embodiments the light module may be variable in that at least one of the one or more light sources may be adjustable. For example, the light sources may be adjustable from an off position to an intensity. In some embodiments the light sources, such as one or more LEDs, may be adjustable by one or more levels or degrees. For example, the LEDs may be have six distinct settings corresponding to varying intensity intervals, such as 0%, 20%, 40%, 60%, 80%, and/or 100% intensity. In other embodiments the distinct varying intensities or power levels may be of different amounts. For example the varying intensity levels may include: 0%, 20%, 30%, 35%, 40%, 50%, 60%, 80%, and/or 100%. In some embodiments adjusting the intensity levels may be performed by the light source, the light module 155, and/or a different module (e.g., data module 150) of system 100 or another system. In some embodiments the intensity of the light source may be adjusted based at least in part on motion detection data. In some embodiments other characteristics of the light source and/or the light module may be adjusted based at least in part on motion detection data.

In some embodiments this light source may include one or more LEDs. In some embodiments this light source may include one or more infra-red LEDs. In some embodiments this light source may include one or more white, visible LEDs. In some embodiments this light source may include one or more visible-light fixtures, such as a flood light, a porch light, etc. In some embodiments this light source may include multiple types of lights, such as incorporating infrared LEDs and a flood light. In some embodiments this light source may include lights that preexisted system 100 and/or at least some of its components. For example, the light source may include preexisting structural lighting—including a floodlight and/or a porch light near a structure's entry. In some embodiments the light module may include one or more different types of light sources. For example, the light module may include one or more LEDs and one or more flood lights.

Figure 2:
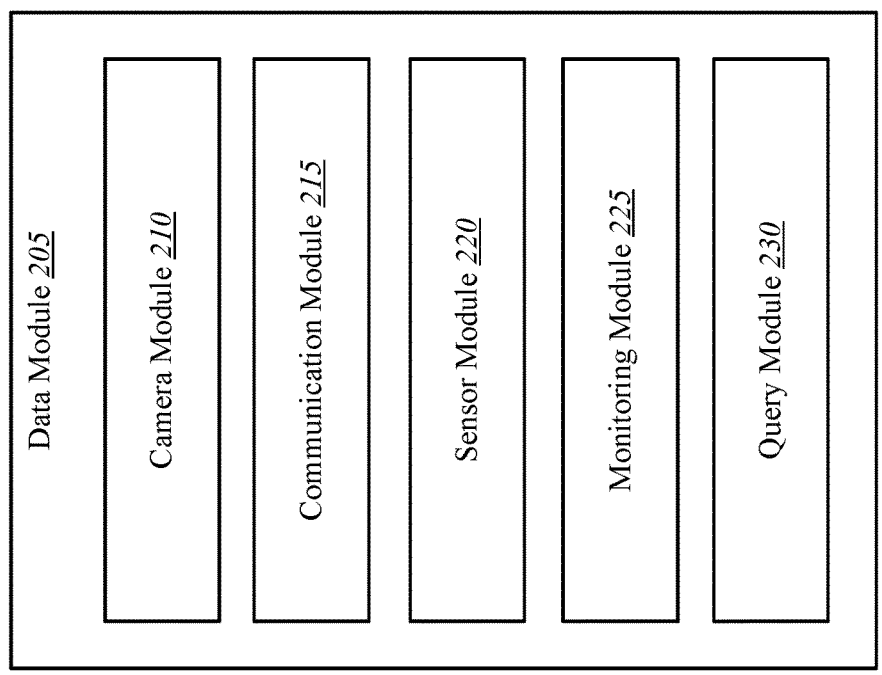
FIG. 2 depicts a block diagram of exemplary systems and methods suitable for implementing the present systems and methods.
Figure 2:

FIG. 2 is a block diagram illustrating one example of a data module 205. The description and characteristics disclosed about data module 205 may apply to one or more of other modules described or shown in any drawing, including but not limited to data modules 150, 165, 180, etc.). In some embodiments data module 205 may include a camera module 210, a communication module 215, a sensor module 220, a monitoring module 225, and/or a query module 230.

In some embodiments camera module 210 may have similar and/or different characteristics than camera module 145. In some embodiments data module 205 may or may not include every module shown in FIG. 2—including, for example, camera module 210 that may or may not be included if movement detection module 105 includes camera module 145. Data module 205 may capture motion detection data such as an image and/or a video—using a camera.

The movement detection module 105 may be connected via a wireless and/or wired connection 160. In some embodiments movement detection module 105 may be wired to doorbell wiring (e.g., connection 160). The connection 160 may include a first wire and a second wire. The connection 160 may include at least a portion of preexisting doorbell or other device wiring that pre-dates an installation of the movement detection module 105. In some cases the installation of the movement detection module 105 may include replacing a preexisting device that may have been wired with preexisting wiring. In some embodiments communication module 215 may send—over a wired or a wireless connection—captured movement detection data associated with the camera. For example, communication module 215 may relay a captured image over the wiring. As another example, communication module 215 may relay a captured video and/or auditory data over the wiring.

In some cases camera module 210 may continuously capture images via the doorbell camera. In some embodiments this may include capturing movement detection data at a predetermined frame rate—continuously or non-continuously. Characteristics of the motion detection data and how such data may be captured, analyzed, determined according to: a setting of a user policy, a user preference (e.g., user related content 195), be pre-programmed based on the limitations of system 100, may be set based on one or more characteristics of system 100, may be determined based at least in part on movement detection data received by data module 205, and/or other functions discussed in this disclosure.

In some embodiments sensor module 220 may detect motion via a sensor in the movement detection module. After detecting the motion via the sensor, camera module 210 may capture one or more images via a camera. After determining that the camera is set to record continuously, camera module 210 may adjust a frame rate of the camera from a first frame rate to a second frame rate upon detecting the motion via the sensor.

In some embodiments sensor module 220 may include sensors capable of determining environmental parameters, but may or may not be able to determine motion. In this case, determining motion may be done, solely or at least in part, based on the movement detection data captured by a camera module, such as camera module 210. Thus, identifying a movement of an object may be performed by analyzing motion detection data captured by one or more cameras at an instance in time and/or over an interval.

In some embodiments monitoring module 225 may detect an actuation of a button or other device via actuator module 135. After detecting the press of the button, camera module 210 may capture movement detection data via camera module 210. In some embodiments camera module 210 may adjust a frame rate of the camera from a first frame rate to a second frame rate based at least in part on information received by monitoring module 225, which may be received in some cases from actuator module 135.

In some cases query module 230 may receive, via a wired or wireless connection, a request to capture movement detection data. In some embodiments communication module 215 may send the requested movement detection data, such as one or more images, to a computing device, such as computing device 125, for display. For example, captured movement detection data may be sent from the movement detection module 105 over a connection 160 to chime module 110. The chime module 110 may then send the movement detection data to a computing device 125 over a network 115, including one or more wired and/or wireless network connections.

In one embodiment, communication module 215 may send, over a wired connection, the movement detection data to a chime module 110 where the movement detection module 105 may be installed on an exterior of a structure and the chime module 110 may be installed on an interior of the same structure, an interior of a different structure, on an exterior of a different structure, or at a different position on exterior of the same structure.

In some embodiments the movement detection module 105 may send the movement detection data directly to the computing device 125 using a data networking connection of one or more wired and/or wireless network connections. In one embodiment, communication module 215 may send, over a wired and/or a wireless connection, the movement detection data to the computing device 125 where the movement detection module 105 may be installed on an exterior of a structure and the computing device 125 may be located within an interior of the same structure, within an interior of a different structure, outside and/or on an exterior of a different structure, or at a different position outside and/or on an exterior of the same structure.

In some embodiments the movement detection module 105 may send the movement detection data directly to the control unit 120 using a data networking connection of one or more wired and/or wireless network connections. In one embodiment, communication module 215 may send, over a wired and/or a wireless connection, the movement detection data to the control unit 120 where the movement detection module 105 may be installed on an exterior of a structure and the control unit 120 may be located within an interior of the same structure, within an interior of a different structure, outside and/or on an exterior of a different structure, or at a different position outside and/or on an exterior of the same structure.

In some embodiments the movement detection module 105 may send the movement detection data to database 130—directly or indirectly—where the movement detection data may be saved, stored, analyzed, modified, evaluated, examined, etc. In some embodiments the movement detection module 105 may send the movement detection data to computing device 125—directly or indirectly—where the movement detection data may be saved, stored, analyzed, modified, evaluated, examined, etc. In some embodiments the movement detection module 105 may send the movement detection data to control unit 120—directly or indirectly—where the movement detection data may be saved, stored, analyzed, modified, evaluated, examined, etc.

In some embodiments communication module 215 may receive movement detection data (associated with a camera in a movement detection module 105) at a chime module 110. The data may be sent over wiring between the chime module 110 and the movement detection module 105. In some embodiments communication module 215 may send the data received at the chime module 110 to a control unit 120 over a network 115.

In some embodiments communication module 215 may receive a request to capture one or more images using the camera in the doorbell unit. Communication module 215 may send, from the chime module 110, the request to the movement detection module 105 over a wired and/or wireless connection 160. In response, communication module 215 may receive, at the chime module 110, the requested one or more images over a wired connection. In some cases communication module 215 may send, from the chime module 110, the movement detection data to a control unit 120 over a data communication network, like network 115. Additionally, or alternatively, communication module 215 may send, from the chime module 110, the movement detection data to a computing device 125 over a data communication network, like network 115.

In some embodiments communication module 215 may generate a notification in response to receiving an identification or another signal from any other module, including, but not limited to, camera module 210, sensor module 220, monitoring module 225, query module 230, actuator module 135, sensor module 140, camera module 145, light module 155, and/or others. This notification may be sent to one or more elements of system 100.

In some embodiments communication module 215 in conjunction with a control unit 120 may display a notification on a display, which may include user interface 170. This notification may relate at least in part to the movement detection data and/or other information related to elements of the movement detection module including, but not limited to, actuator module 135, sensor module 140, camera module 145, data module 150, and/or light module 155.

In some embodiments system 100 may adjust the one or more light sources automatically based on receiving one or more inputs including, but not limited to, inputs related to movement detection data. These inputs may at least include analyzing movement detection data and/or identifying one or movements of one or more objects. In some embodiments system 100 may permit a user to manually adjust the one or more light sources based on one or more received inputs.

In some embodiments communication module may send a captured image and/or a notification to a set top box. Communication module 215 may display the notification in relation to a presently viewed channel of subscriber program content. In some cases communication module 215 may display the notification in at least a portion of a viewing area of a display. For example, a user watching content from a satellite DVR on a television may receive a notification displayed on at least a portion of the screen of the television. In relation to a set-top box service, the notification may include a scrolling message, a picture-in-picture message, and/or switching to a notification or monitoring channel that includes data and/or information in relation to the detected action. For example, a channel dedicated to displaying images captured by a doorbell camera may be integrated within a channel guide of subscriber program content. Thus, in some cases images captured using a doorbell camera may be recorded and stored in a DVR or other similar media storage and/or viewing device. In some embodiments communication module may send a captured image and/or a notification to a hand-held user devices such as a smart phone, a tablet, a Google® glass display, a personal computer, and/or another portable, visual display.

Figure 3:
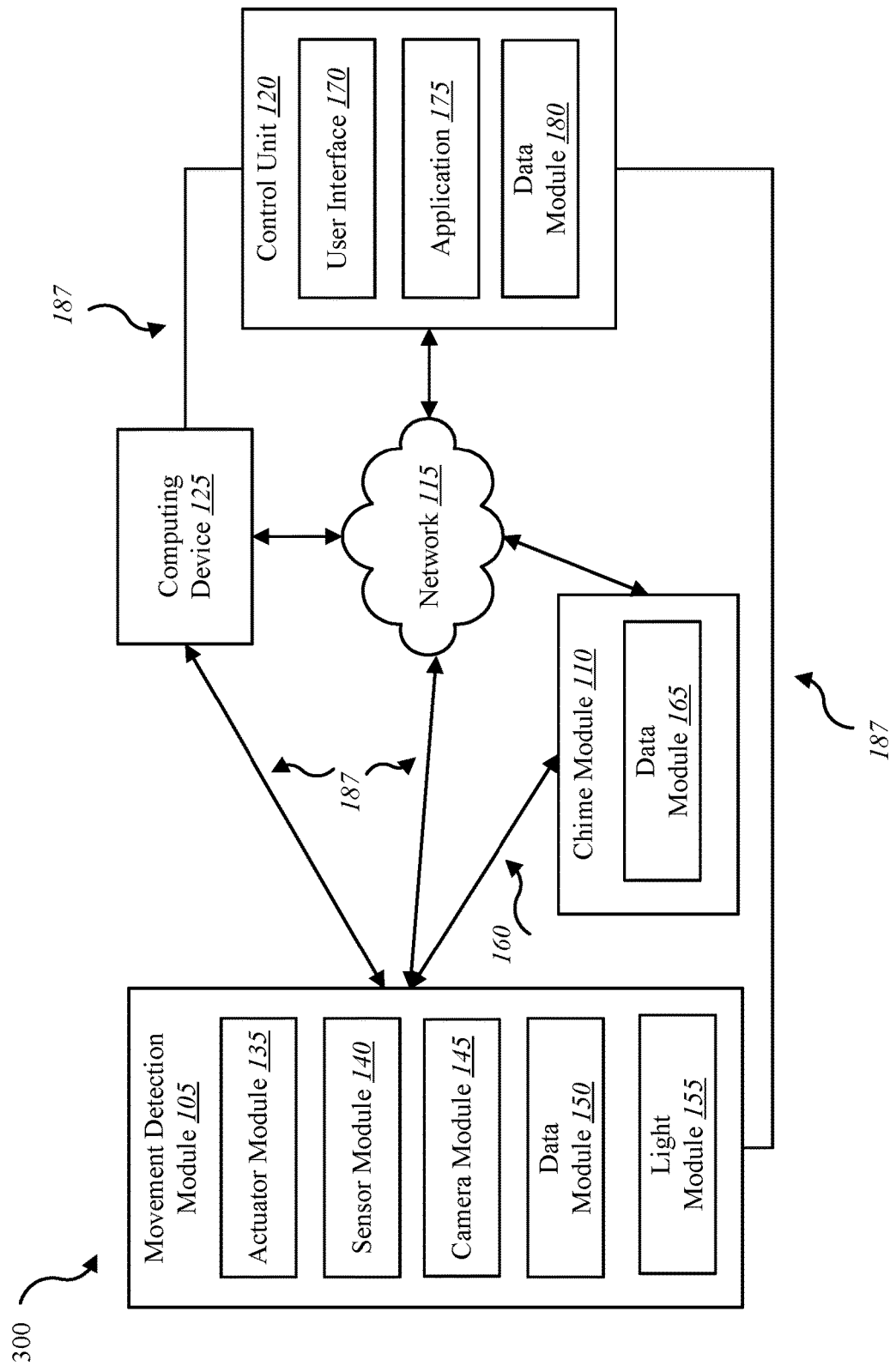
FIG. 3 depicts a block diagram of exemplary systems and methods suitable for implementing the present systems and methods.

FIG. 3 is a block diagram illustrating some embodiments of a system 300 in which the present systems and methods may be implemented. In some embodiments system 300 may include at least some of the same, similar, and/or different characteristics than system 100 discussed above. In some embodiments the systems and methods described in this disclosure may be performed in relation to one or more devices illustrated in system 300. The system 300 may include movement detection module 105, chime module 110, control unit 120, computing device 125, and/or network 115.

In some embodiments one or elements may be in wired or wireless communication connections (e.g., 160, 187) directly (e.g., movement detection module 105 communicating directly with control unit 120) and/or indirectly (e.g., movement detection module 105 communicating with control unit 120 through network 115). In some embodiments some connections may include wired and/or wireless connections while others may include different wired and/or wireless connections. For example, connection 160 may include at least a wired connection, while connections 187 may include at least a wireless connection. In some embodiments additional connections of similar or different types may be included as part of system 300—whether presently shown or not. For example, chime module 110 may be directly connected to control unit 120 via a wired and/or a wireless connection.

It should be noted that only some variations of the exemplary systems, such as systems 100 and 300, are shown and/or described and that a person of ordinary skill in the art having a basic understanding of some concepts will be able to implement the ideas disclosed here to perform one or more movement detections based on movement detection data and other functions disclosed. In some embodiments some, most, all, and/or any other combination of the elements shown in FIGS. 1-3 may be related, connected, and/or in communication with each other.

Figure 4:
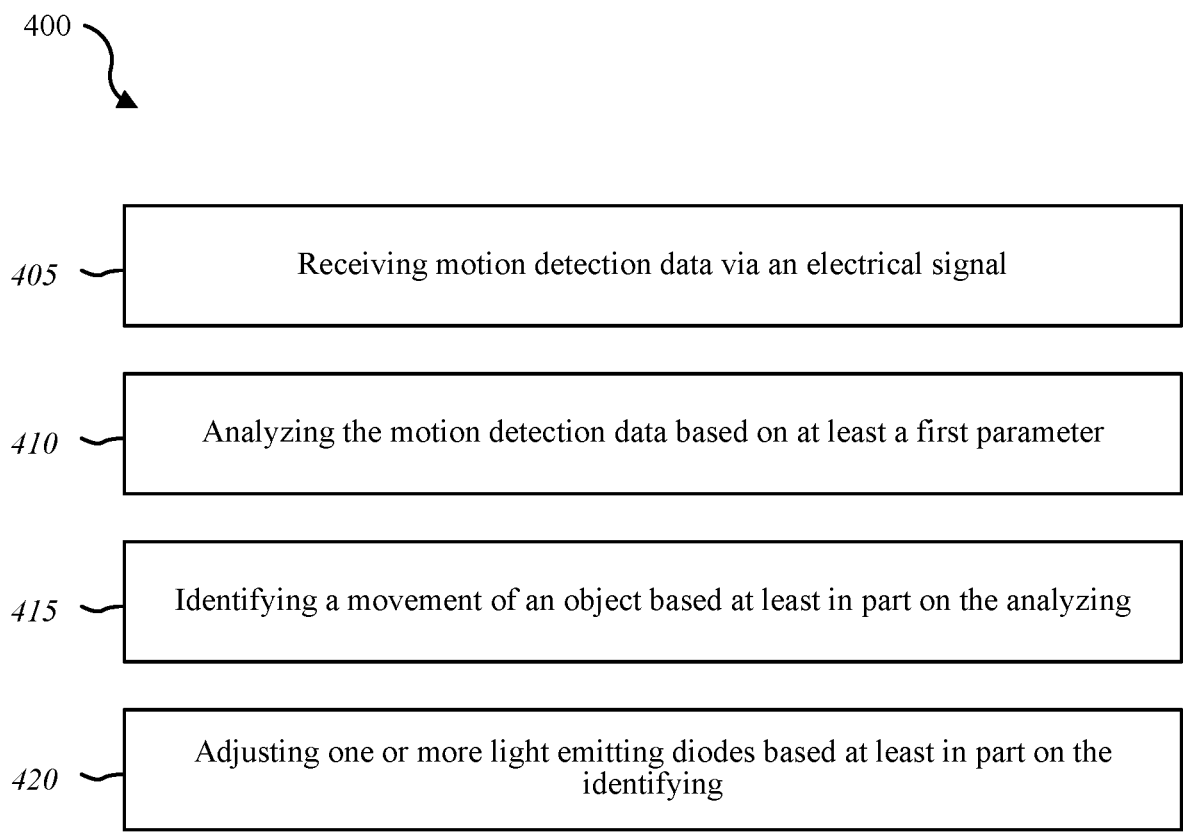
FIGS. 4-8 depict block diagrams of exemplary methods and systems suitable for implementing the present systems and methods.

FIG. 4 shows exemplary methods 400 and systems in accordance with some embodiments. In some embodiments a method incorporating the present systems and methods may include receiving motion detection data via an electrical signal, analyzing the motion detection data based on at least a first parameter, identifying a movement of an object based at least in part on the analyzing, and/or adjusting one or more light emitting diodes based at least in part on the identifying—as shown in blocks 405, 410, 415, and 420.

In some embodiments receiving motion detection data via an electrical signal may occur based on a camera module, such as camera module 145, capturing certain motion detection data and then one or more other components, including but not limited to, data module 150, chime module 110, computing device 125, control unit 120, and/or database 130 receiving this motion detection data via a communication link.

In some embodiments this motion detection data may include one or more still images, videos, auditory inputs, tactile inputs, and/or other inputs.

In some embodiments one or more devices in a system may analyze the received motion detection data. Analyzing this data may include analyzing one or more still images, videos, auditory inputs, tactile inputs, and/or other inputs. In some embodiments this analysis may include analyzing two or more images, videos, auditory inputs, tactile inputs, and/or other inputs. In some embodiments this analysis may include analyzing different segments, subsections, or other characteristics of the same type of motion detection data. For example, analyzing the motion detection data may include analyzing a first segment of a video (stored and/or being captured in real-time) and analyzing a different second segment of the same video, which may or may not include one or more overlapping segments.

In some embodiments this analysis may include analyzing two or more different inputs including, but not limited to, images, videos, auditory inputs, tactile inputs, and/or other inputs. For example, analyzing the motion detection data may include analyzing a captured still image and comparing it with a video (stored and/or being received in real-time). As another example, analyzing the motion detection data may include analyzing a captured still image and comparing it with an auditory input (stored and/or being received in real-time).

In some embodiments analyzing the motion detection data includes analysis based on one or more parameters, which may lead to identifying a movement of an object. These parameters may include, but are not limited to, characteristics of the motion detection data. This analysis may include using one or more algorithms to identify movement by comparing one or more of: shading, object location, object existence, object appearance, color, height, length, width, position, reflectivity, existence of facial characteristics (i.e., pupils, facial recognition, nose, mouth, etc.), decibel level, sound recognition, voice recognition including voice intonation, frequency, fingerprint or biometric signal, etc.

In some embodiments identifying a movement of an object may be based at least in part on analyzing motion detection data. This identifying may include making a determination, a correlation, and/or other conclusion about the motion detection data based at least in part on the analysis. For example, if the motion detection data includes a new object in some data that is not present in other data—based on some predetermined and/or dynamic values and/or thresholds—then a movement of an object may be identified.

In some embodiments identifying a movement of an object may be based at least in part on analyzing past motion detection data, which may include data captured more than a year ago, a month ago, a week ago, a day ago, an hour ago, etc. This past data may include data from a different acquiring event and/or events. For example, this data may include a still image captured only minutes prior but during a different acquiring event. In some embodiments identifying a movement of an object may be based at least in part on analyzing current motion detection data. Current motion detection data may include data acquired during a continuous and/or a discreet acquiring event. For example, identifying a movement of an object may be based at least in part on analyzing real-time data and/or data from the same discreet acquiring event (if an event included recording data continuously or at intervals for 30 minutes, analyzing the data may include analyzing data during real time and/or data from 20 minutes prior). In some embodiments identifying a movement of an object may be based at least in part on analyzing past and current motion detection data.

Based at least in part on identifying a movement of an object, a method may include adjusting a light source. This light source may be connected to one or more elements found in systems 100, 200, and/or 300, among others, including light module 155. In some embodiments this light source may include one or more LEDs. In some embodiments this light source may include one or more infra-red LEDs. In some embodiments this light source may include one or more white visible LEDs. In some embodiments this light source may include other light sources. In some embodiments this light source may include one or more visible-light fixtures, such as a flood light, a porch light, etc. In some embodiments this light source may include multiple types of lights, such as incorporating infra-red LEDs and a flood light.

In some embodiments adjusting one or more LEDs may include adjusting them from a first intensity level to a second intensity level. In some embodiments adjusting one or more LEDs may include adjusting them from an off status (a zero intensity level) to a higher intensity level. In some embodiments adjusting one or more LEDs may include adjusting them from a lower intensity level to a higher intensity level. In some embodiments adjusting one or more LEDs may include adjusting them from a 0%-50% intensity level to a 51%-100% intensity level. In some embodiments adjusting one or more LEDs may include adjusting them from a 51%-100% intensity level to a 0%-50% intensity level.

In some embodiments adjusting the one or more light emitting diodes may include changing an intensity level of one or more LEDs. In some embodiments adjusting the one or more light emitting diodes may include changing an intensity level of one or more LEDs from a first intensity level to a second intensity level. In some embodiments adjusting the one or more light emitting diodes may include changing the intensity level of the one or more light emitting diodes from the second intensity level to a third intensity level. In some embodiments adjusting the LEDs from one intensity level to another intensity level may be based at least in part on movement detection data, including analyzing the movement detection data and/or identifying a movement of an object related to movement detection data.

In some embodiments iteratively adjusting the intensity level of the LEDs may include analyzing (or performing other functions) the movement detection data before and/or after adjusting an intensity level. For example, the system may analyze movement detection data and adjust an intensity level from a first intensity level to a second intensity level and then may analyze movement detection data and adjust an intensity level from a second intensity level to a third intensity first intensity level based at least in part on the analysis. In addition, the second set of analysis (after adjusting to a second intensity level) may include a more sophisticated analysis that accounts for the results of the first analysis (in this example performed before adjusting the intensity level from the first intensity level to the second intensity level).

Figure 5:
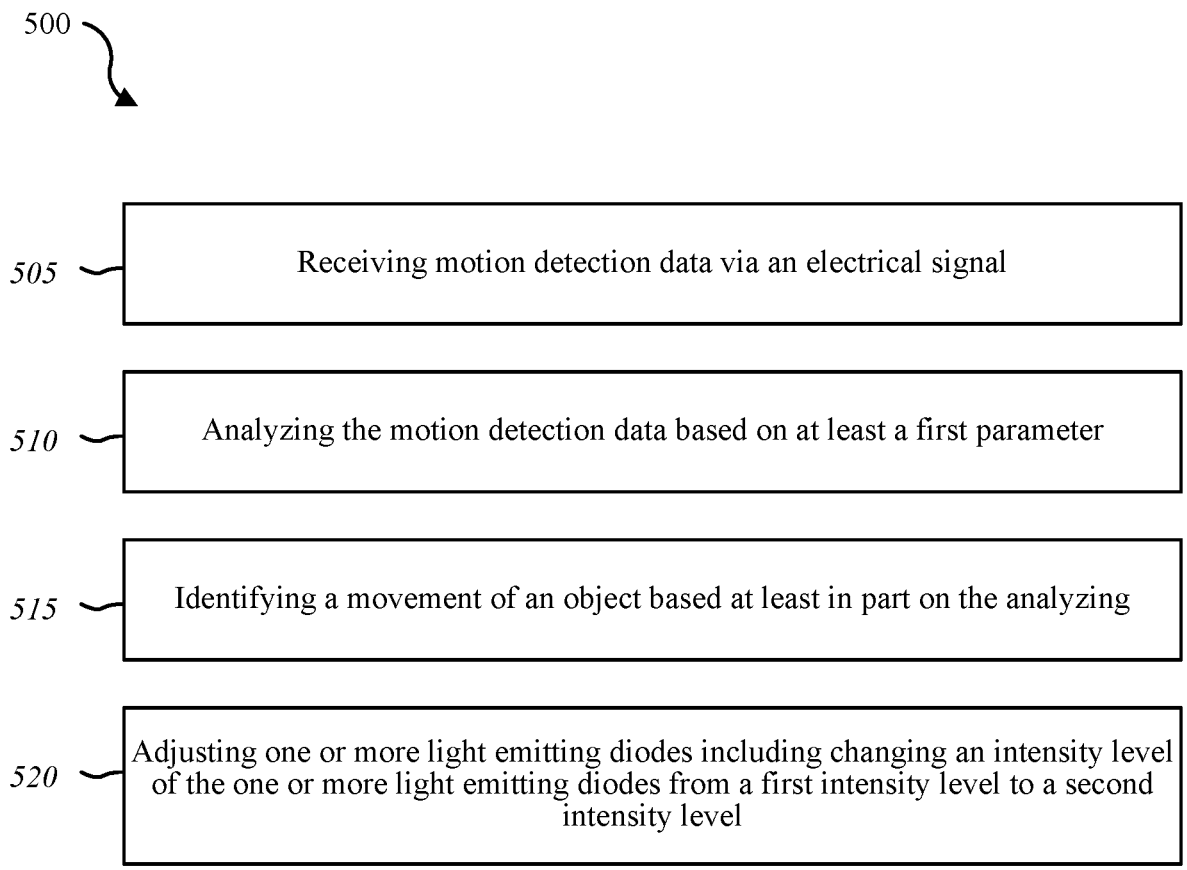

FIG. 5 shows exemplary methods 500 and systems in accordance with some embodiments. In some embodiments a method incorporating the present systems and methods may include receiving motion detection data via an electrical signal, analyzing the motion detection data based on at least a first parameter, identifying a movement of an object based at least in part on the analyzing, and/or adjusting one or more light emitting diodes including changing an intensity level of the one or more light emitting diodes from a first intensity level to a second intensity level—as shown in blocks 505, 510, 515, and 520.

Figure 6:
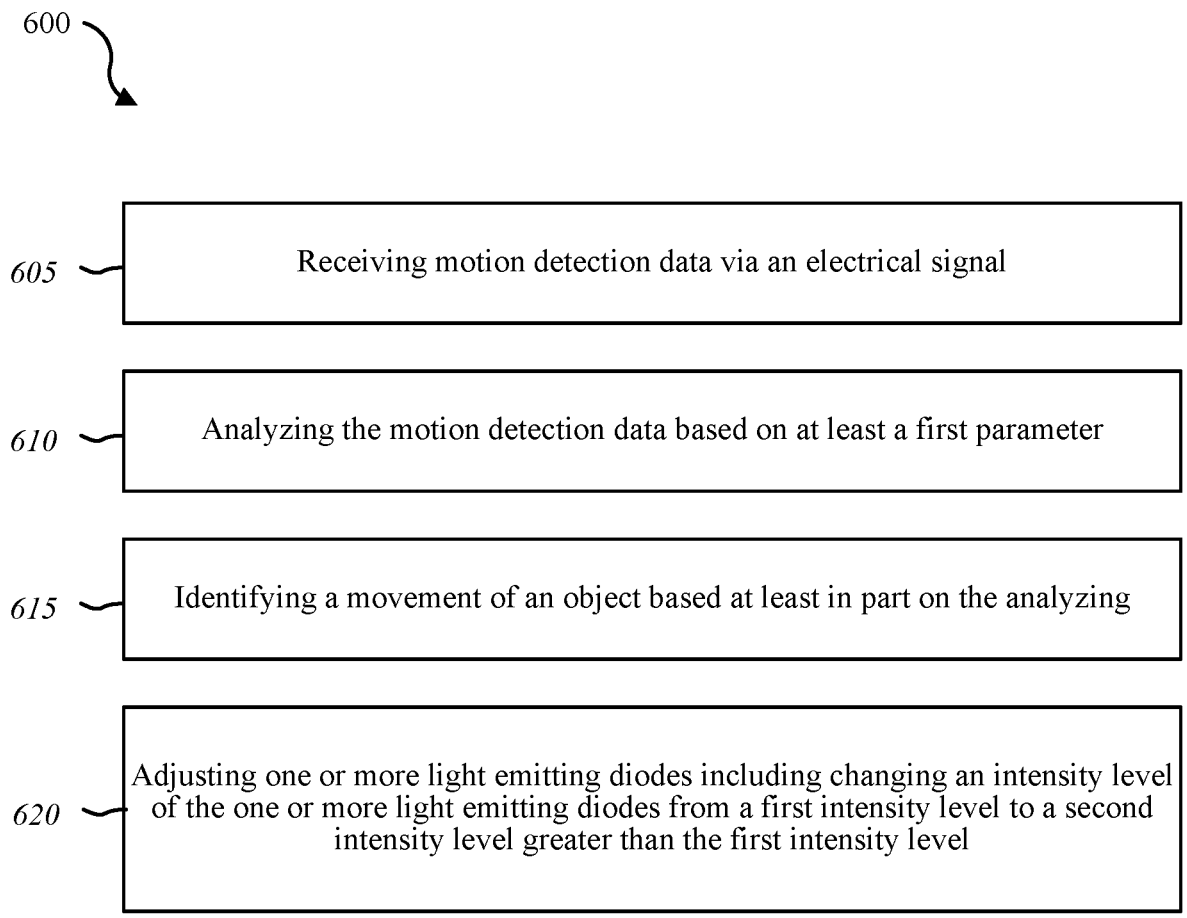

FIG. 6 shows exemplary methods 600 and systems in accordance with some embodiments. In some embodiments a method incorporating the present systems and methods may include receiving motion detection data via an electrical signal, analyzing the motion detection data based on at least a first parameter, identifying a movement of an object based at least in part on the analyzing, and/or adjusting one or more light emitting diodes including changing an intensity level of the one or more light emitting diodes from a first intensity level to a second intensity level greater than the first intensity level—as shown in blocks 605, 610, 615, and 620. In some embodiments this adjustment to a greater intensity level is performed based on identifying a movement of an object. By adjusting the intensity level from a first intensity level to a greater, second intensity level, the system and the method may be able to better identify the object itself—such as a person—related to the movement.

Figure 7:
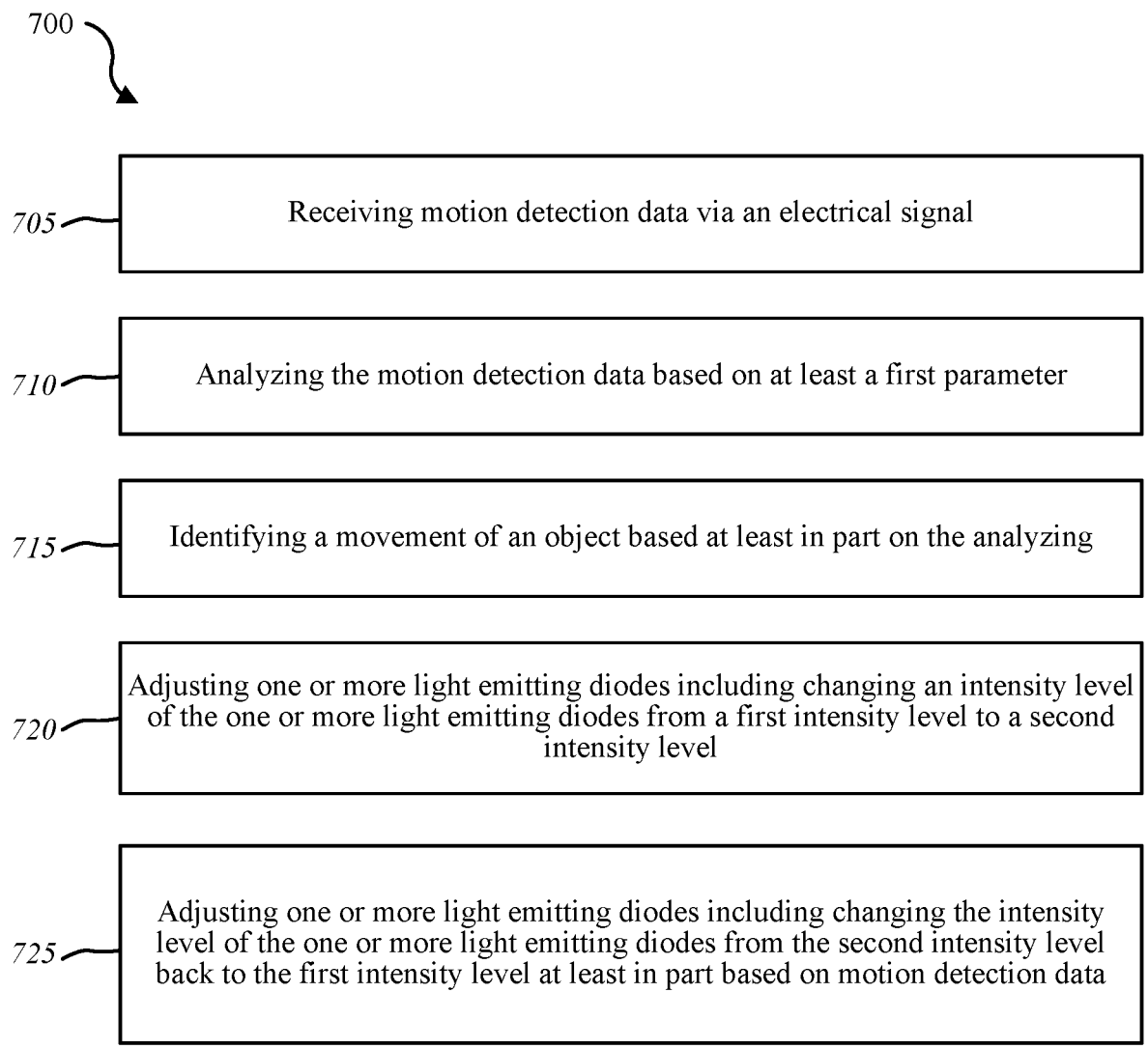

FIG. 7 shows exemplary methods 700 and systems in accordance with some embodiments. In some embodiments a method incorporating the present systems and methods may include receiving motion detection data via an electrical signal, analyzing the motion detection data based on at least a first parameter, identifying a movement of an object based at least in part on the analyzing, adjusting one or more light emitting diodes including changing an intensity level of the one or more light emitting diodes from a first intensity level to a second intensity level, and/or adjusting one or more light emitting diodes including changing the intensity level of the one or more light emitting diodes from the second intensity level back to the first intensity level at least in part based on motion detection data—as shown in blocks 705, 710, 715, 720, and 725.

Figure 8:
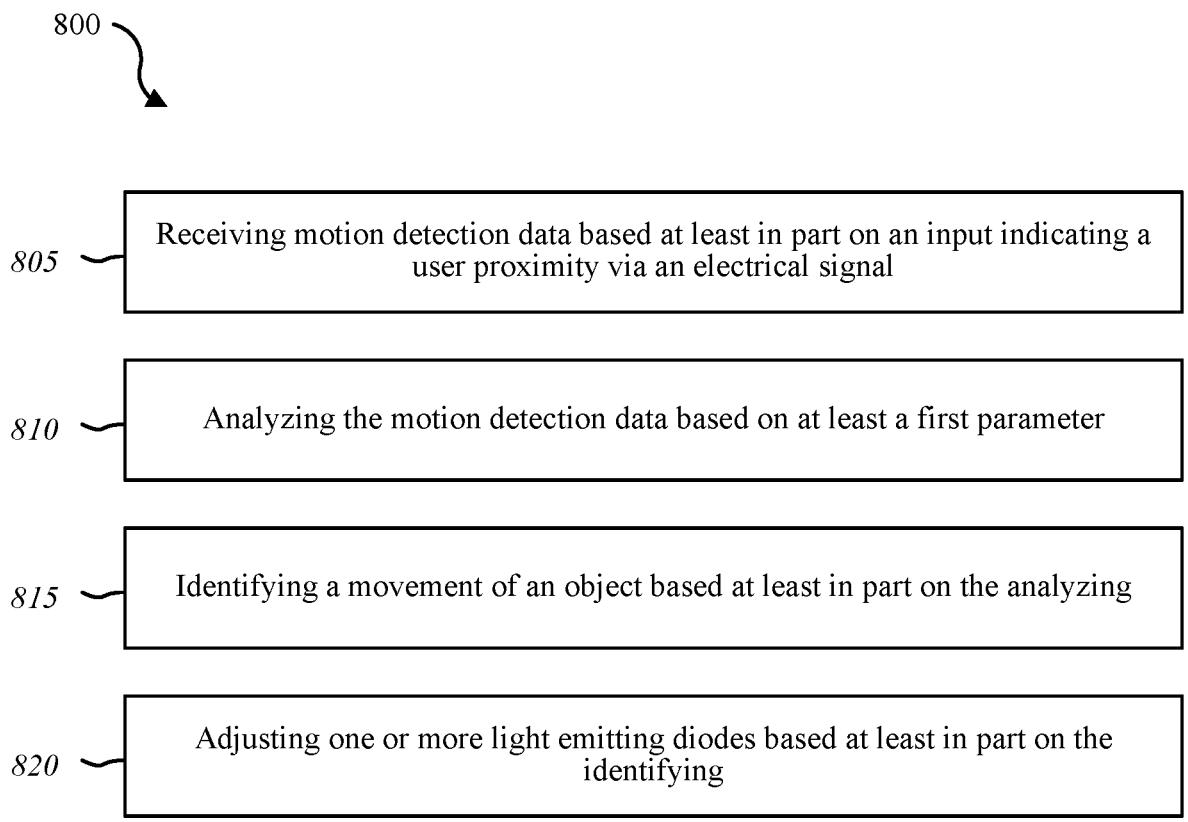

FIG. 8 shows exemplary methods 800 in accordance with some embodiments. In some embodiments methods incorporating the present systems and methods may include receiving motion detection data based at least in part on an input indicating a user proximity via an electrical signal, analyzing the motion detection data based on at least a first parameter, identifying a movement of an object based at least in part on the analyzing, and/or adjusting one or more light emitting diodes based at least in part on the identifying—as shown in blocks 805, 810, 815, and 820.

In some embodiments the motion detection data may be based at least in part on a user's proximity to one or more devices in systems 100, 200, 300, and/or others. In some embodiments this proximity may be determined based on analyzing the motion detection data itself using the methods described in this disclosure. For example, by analyzing one or more still images the system may determine a user's or an object's proximity to one or more devices such as camera module 145. As another example, by analyzing one or more videos the system may determine a user's or an object's proximity to one or more devices such as camera module 145. In some embodiments this proximity may be determined based on input received by the movement detection module. In some embodiments this input may include an input received at or from a proximity detection module.

Figure 9:
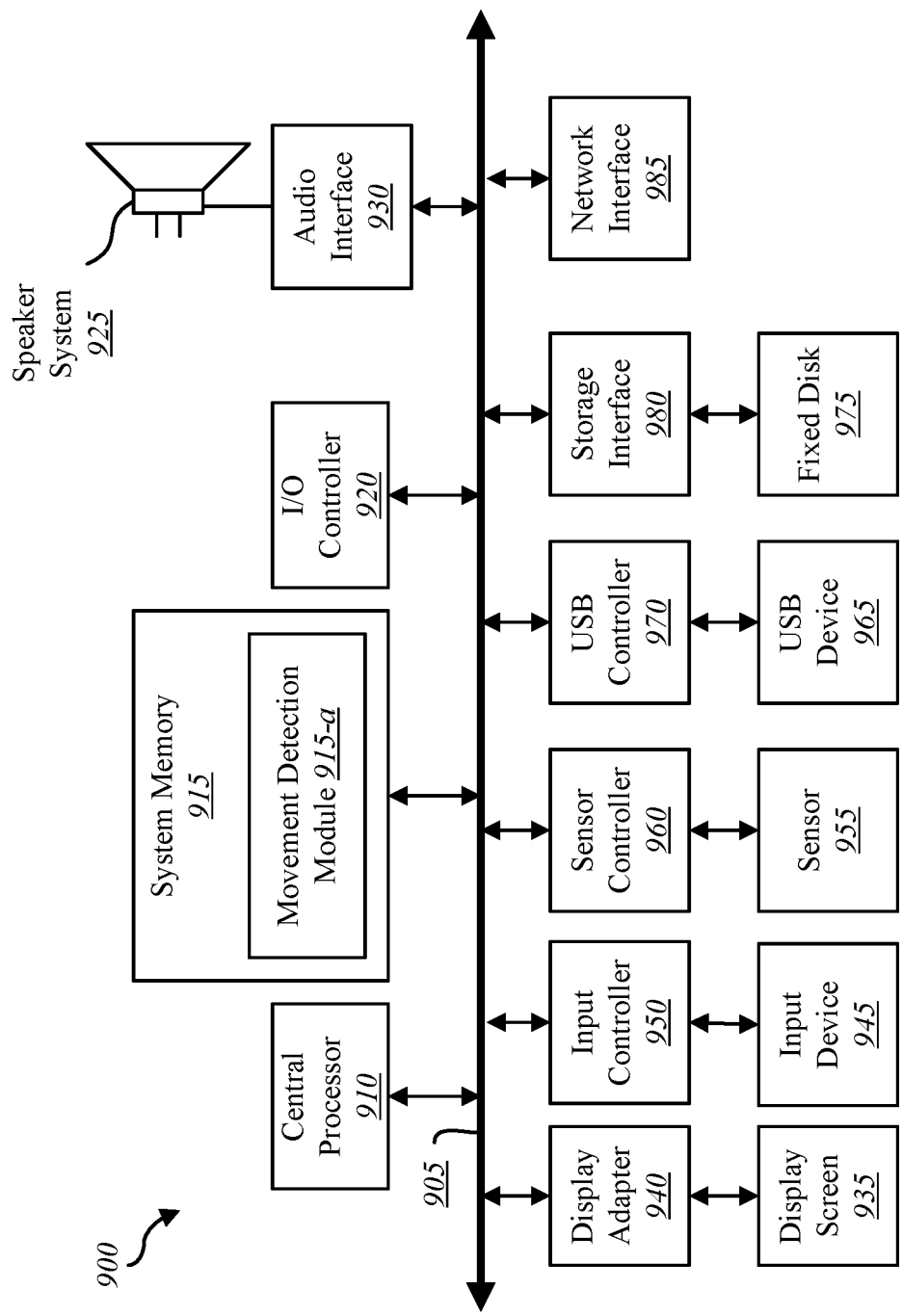
FIG. 9 depicts a block diagram of exemplary systems and methods suitable for implementing the present systems and methods.

FIG. 9 depicts a block diagram of a controller 900 suitable for implementing the present systems and methods. In some embodiments controller 900 includes a bus 905 which interconnects major subsystems of controller 900, such as a central processor 910, a system memory 915 (typically RAM, but which may also include ROM, flash RAM, and/or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 1070), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the movement detection module 915-*a* to implement the present systems and methods may be stored within the system memory 915. Applications resident with controller 900 are generally stored on and accessed via a non-transitory computer readable medium, such as a hard disk drive (e.g., fixed disk drive 975) or other storage medium. Additionally, applications can be in the form of electronic signals modulated in accordance with the application and data communication technology when accessed via network interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments one or more sensors (e.g., motion sensor, smoke sensor, glass break sensor, door sensor, window sensor, carbon monoxide sensor, and the like) connect to controller 900 wirelessly via network interface 985 and/or using wired connections.

Many other devices or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 may be readily known in the art and are not discussed in detail in this application. Code to implement the present disclosure can be stored in a non-transitory computer-readable medium such as one or more of system memory 915 or fixed disk drive 975. The operating system provided on controller 900 may be iOS®, ANDROID®, MS-dOS®, MS-WINDOWS®, OS/2®, UNIX®, LINUX®, or another known operating system.

In some embodiments one or more systems and/or system components may serve as or include one or more transmitters and/or receivers—such as an antenna—to receive one or more signals. The signals received may include wireless communication signals such as radio frequency, electromagnetics, local area network (LAN), wide area network (WAN), virtual private network (VPN), wireless network (using 802.11, for example), cellular network (using 3G and/or LTE, for example), or other signals. These antennas may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna may receive signals or information specific to itself. In other embodiments each antenna may receive signals or information not exclusive to itself.

In some embodiments this disclosure may specifically apply to security system applications. In some embodiments this disclosure may specifically apply to home or business automation system applications, including this comprising a doorbell having a video camera. Distinct advantages of such a system for these specific applications are apparent from this disclosure.

While this disclosure discusses various embodiments using specific block diagrams, flowcharts, and examples, each block diagram component, flowchart action, operation, and/or component described and/or illustrated may be implemented, individually and/or collectively, using a wide range of hardware, software, and/or firmware (or any combination thereof) configurations. In addition, any disclosure of components contained within other components or separate from other components should be considered exemplary because multiple other architectures may potentially be implemented to achieve the same functionality, including incorporating all, most, and/or some elements as part of a unitary structure or separate structures.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least in part on."

What is claimed is:

1. A computer-implemented method for security system monitoring comprising:
    operating a security system at a first motion detection sensitivity level;
    adjusting, by a processor, from the first motion detection sensitivity level to a second motion detection sensitivity level based at least in part on a first intensity level in a spectrum of one or more light emitting diodes of the security system;
    identifying, by the processor, a movement of an object; and
    modifying, by the processor, the one or more light emitting diodes of the security system from the first intensity level in the spectrum to a second intensity level in the spectrum based at least in part on the identifying, wherein the modifying from the first intensity level in the spectrum to the second intensity level in the spectrum is based at least in part on adjusting from the first motion detection sensitivity level to the second motion detection sensitivity level.

2. The method of claim 1, wherein modifying the one or more light emitting diodes from the first intensity level in the spectrum to the second intensity level in the spectrum based at least in part on adjusting form the first motion detection sensitivity level to the second motion detection sensitivity level further comprises:
    modifying from the first intensity level in the spectrum to the second intensity level in the spectrum is inversely related to the adjusting form the first motion detection sensitivity level to the second motion detection sensitivity level.

3. The method of claim 1, wherein modifying the one or more light emitting diodes from the first intensity level in the spectrum to the second intensity level in the spectrum based at least in part on adjusting form the first motion detection sensitivity level to the second motion detection sensitivity level further comprises:
    modifying from the first intensity level in the spectrum to the second intensity level in the spectrum is complimentarily related to the adjusting form the first motion detection sensitivity level to the second motion detection sensitivity level.

4. The method of claim 1, further comprising:
    receiving, by the processor of the security system, motion detection data via an electrical signal, wherein identifying the movement of the object is based at least in part on the received motion detection data; and
    analyzing, by the processor, the motion detection data based at least in part on the second motion detection sensitivity level, wherein identifying the movement of the object is based at least in part on the analyzing.

5. The method of claim 4, wherein the motion detection data is received when the one or more light emitting diodes of the security system are operating at the first intensity level.

6. The method of claim 4, wherein the motion detection data comprises at least one of an image captured by a motion sensing camera or video captured by the motion sensing camera.

7. The method of claim 4, wherein analyzing the motion detection data further comprises:
    analyzing a first input and a second input.

8. The method of claim 7, wherein the first input comprises one or more of a video, a first segment of a video, a first captured image, a first audio input, and a first tactile input, and wherein the second input comprises one or more of a second video, a second segment of a video, a second captured image, a second audio input, and a second tactile input.

9. The method of claim 1, wherein the second motion detection sensitivity level is more sensitive than the first motion detection sensitivity level.

10. The method of claim 1, wherein the second motion detection sensitivity level is less sensitive than the second motion detection sensitivity level.

11. The method of claim 1, wherein modifying the one or more light emitting diodes of the security system further comprises:
    modifying an intensity level of the one or more light emitting diodes of the security system from the second intensity level in the spectrum to a third intensity level in the spectrum.

12. The method of claim 1, wherein the second intensity level in the spectrum is greater than the first intensity level in the spectrum.

13. The method of claim 1, wherein the second intensity level in the spectrum is at least double the first intensity level in the spectrum.

14. The method of claim 1, wherein the first intensity level in the spectrum is between 20% and 40% of full intensity for the one or more light emitting diodes.

15. The method of claim 1, wherein the second intensity level in the spectrum is more than 50% of full intensity for the one or more light emitting diodes of the security system.

16. The method of claim 4, wherein modifying the one or more light emitting diodes of the security system further comprises:
modifying the one or more light emitting diodes of the security system from the second intensity level in the spectrum back to the first intensity level in the spectrum based at least in part on the motion detection data.

17. The method of claim 1, wherein the one or more light emitting diodes of the security system comprise infrared light emitting diodes.

18. The method of claim 1, further comprising:
identifying the object based at least in part on modifying the one or more light emitting diodes of the security system from the first intensity level in the spectrum to the second intensity level in the spectrum.

19. An apparatus for security system monitoring, comprising:
a motion sensing camera to capture motion detection data;
a doorbell actuator;
an adjustable light source of a security system;
at least one processor;
memory in electronic communication with the at least one processor; and
instructions stored in the memory, the instructions being executable by the at least one processor to:
operate the security system at a first motion detection sensitivity level;
adjust, by the at least one processor, from the first motion detection sensitivity level to a second motion detection sensitivity level based at least in part on a first intensity level in a spectrum of one or more light emitting diodes of the security system;
identify, by the at least one processor, a movement of an object; and
modify, by the at least one processor, the one or more light emitting diodes of the security system from the first intensity level in the spectrum to a second intensity level in the spectrum based at least in part on the identifying, wherein the modifying from the first intensity level in the spectrum to the second intensity level in the spectrum is based at least in part on adjusting from the first motion detection sensitivity level to the second motion detection sensitivity level.

20. A non-transitory computer-readable storage medium of a security system storing computer executable instructions that when executed by a processor cause the processor to:
operate a security system at a first motion detection sensitivity level;
adjust, by the processor, from the first motion detection sensitivity level to a second motion detection sensitivity level based at least in part on a first intensity level in a spectrum of one or more light emitting diodes of the security system;
identify, by the processor, a movement of an object; and
modifying, by the processor, the one or more light emitting diodes of the security system from the first intensity level in the spectrum to a second intensity level in the spectrum based at least in part on the identifying, wherein the modifying from the first intensity level in the spectrum to the second intensity level in the spectrum is based at least in part on adjusting from the first motion detection sensitivity level to the second motion detection sensitivity level.

* * * * *